United States Patent [19]
Valyi

[11] 3,737,259
[45] June 5, 1973

[54] APPARATUS FOR MAKING COMPOSITE PLASTIC ARTICLES

[76] Inventor: Emery I. Valyi, 5200 Sycamore Avenue, Riverdale, N.Y. 10471

[22] Filed: Dec. 23, 1971

[21] Appl. No.: 211,289

[52] U.S. Cl. ............... 425/112, 425/127, 425/242 B, 425/324 B
[51] Int. Cl. ............................................. B29d 29/03
[58] Field of Search ..................... 425/112, 127, 129, 425/242 B, 324 B, 326 B, 387 B; 264/97

[56] References Cited

UNITED STATES PATENTS

| | | | |
|---|---|---|---|
| 3,264,684 | 8/1966 | Moslo | ...........................425/326 BJ |
| 3,023,461 | 3/1962 | Sherman | .......................425/326 B X |
| 3,415,916 | 12/1968 | Valyi | ...........................425/326 BJ X |
| 3,694,124 | 9/1972 | Saumsiegle | .......................425/242 B |

FOREIGN PATENTS OR APPLICATIONS

| | | | |
|---|---|---|---|
| 1,950,212 | 4/1971 | Germany | ...............................264/97 |
| 7,040,435 | 12/1970 | Japan | ....................................264/97 |

*Primary Examiner*—H. A. Kilby, Jr.
*Attorney*—Nathaniel L. Leek

[57] ABSTRACT

Apparatus for making pressure molded composite parisons and blown articles therefrom wherein preformed sleeves are placed mechanically over the blow cores used for molding the parisons.

12 Claims, 12 Drawing Figures

PATENTED JUN 5 1973 3,737,259
SHEET 1 OF 4
FIG 1a
FIG 1b
FIG 1c
FIG 1d
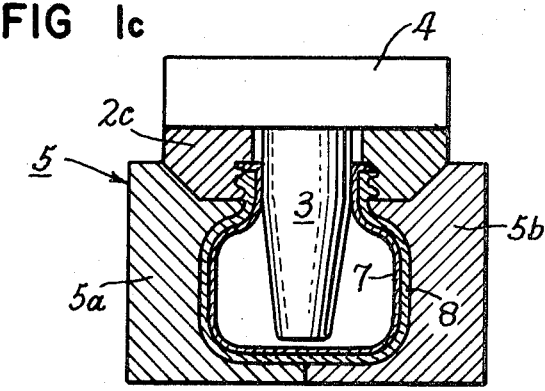
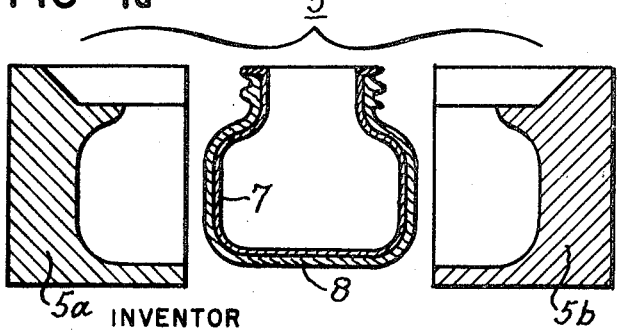
FIG 2
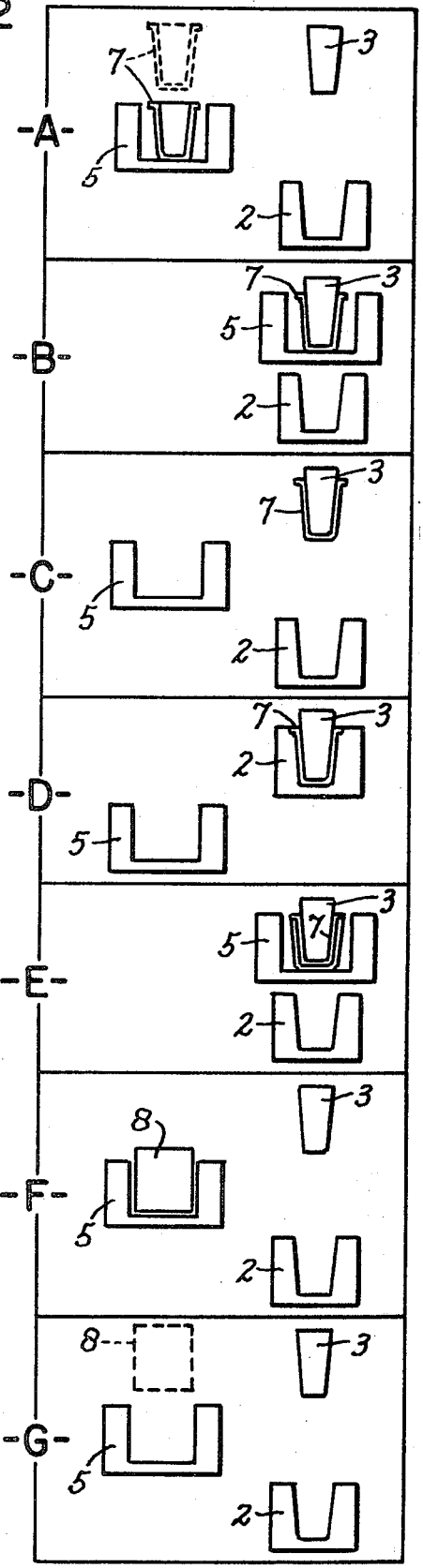
INVENTOR
Emery I. Vatyi
BY
N L Leek
ATTORNEY

APPARATUS FOR MAKING COMPOSITE PLASTIC ARTICLES

This invention relates to novel apparatus for the manufacture of composite plastic containers or the like wherein such containers are formed in a blow mold by expansion of pressure molded parisons that consist of two or more layers of usually different plastics, the outermost layers being pressure molded around the outer layer or layers.

Procedures and apparatus for producing plastic articles in a blow mold from pressure molded parisons are generally described in my U.S. Pat. No. Re. 27,104 and known to persons skilled in the art of injection blow molding.

My copending application Ser. No. 71,734, filed Sept. 14, 1970 describes an injection blow molding method in which a preformed sleeve, made to conform to the outer surface of a blow core, is placed over that core, the core is placed within the parison mold and the parison is then pressure molded around said preformed sleeve. The composite parison so made is then transferred into a blow mold in the manner that is customary in injection blow molding and expanded into conformance with the blow mold by applying air pressure to the inside of the parison by means of the blow core. The preformed sleeve previously placed over the blow core expands together with the remainder of the parison.

An object of this invention is to provide apparatus for placing preformed sleeves over the blow cores prior to pressure molding of the parisons.

Another object is to adapt the placement of the sleeves to the normal operating cycle of injection blow molding machines without prolonging the operating cycles of such machines unduly.

In accordance with the present invention a liner-fixture is provided in which the liners are located in the same spaced arrangement as that of the blow cores over which the liners are to be placed. The fixture with liners therein is then brought into accurate alignment with the blow cores, the liners are transferred onto the blow cores and the empty fixture is removed from the injection blow molding apparatus which then progresses through the normal operating cycle of such apparatus.

In one embodiment of the present invention the blow mold is employed as the liner-fixture, provisions being made to allow for the accurate retention of liners in the blow mold in spite of the fact that the liners do not usually conform to the blow mold cavities.

In another embodiment more than one set of blow cores is employed, so that the liners may be applied to one set of blow cores while another set is used for pressure molding of parisons.

The nature of the invention will be better understood from the following description, taken in connection with the accompanying drawings in which specific embodiments have been set forth for purposes of illustration.

In the drawings:

FIGS. 1a to 1d are elevations, partly in section, of the elements of an apparatus according to the invention, encompassing a blow core, a parison mold, a neck ring, a blow mold and a source of hot plastic, and a liner to be used with such apparatus;

FIG. 2 is a table of symbols and a schematic representation of the arrangement of the elements shown in FIG. 1 in the course of a single operating cycle;

Figure 3:
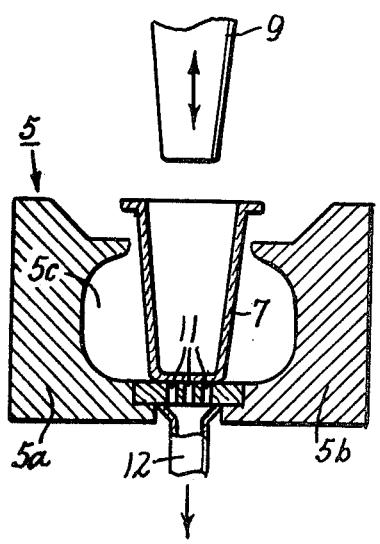
FIG. 3 shows a blow mold, in section, adapted to be used as a liner-fixture.

Referring to the drawings more in detail, the invention is shown as embodied in apparatus comprising the elements illustrated in FIG. 1 in which an extruder or other known injection unit 1 provides hot molten plastic under pressure to a parison mold assembly. The parison mold assembly consists of the parison mold 2 which communicates with the injection unit 1 by means of runner plate 2a, a neck or rim mold 2b and the core 3 (which is usually a blow core) whereby the parison mold 2, the neck mold 2b and the core 3, when assembled as shown, form the parison mold cavity 2b between them. Alongside the parison mold assembly, FIG. 1 also shows a blow mold assembly comprising a blow mold 5 and the neck mold 2d and core 3 previously referred to in conjunction with the parison mold assembly.

In operation, a liner 7 is applied to core 3 before said core is placed into parison mold 2. The core, together with the liner, is then introduced into the parison mold together with neck mold 2c and the assembly clamped firmly together by a force transmitted through platen 4. Hot plastic is then pressed into the parison mold cavity from extruder 1 through runner plate 2a, around the sleeve 7 which is on the core 3. A parison is thus molded, forming a composite structure the inner layer of which is comprised of the material of the sleeve 7 while its outer layer consists of the material pressed around that sleeve from the extruder 1.

The parison may be removed from the parison mold and stored for subsequent use, or it may be transferred immediately into the blow mold 5 while still on the core 3 and within the neck mold 2c. If the latter practice is followed, core 3 is constructed as a blow core 3, i.e. it is provided with an orifice for pressure fluid, usually air, which orifice may be closeable. If the parison is not immediately transferred to the blow mold 5, it requires that it be heated to a temperature suitable for blowing, before being placed in the blow mold; if it is transferred immediately, it is hot enough for blowing upon introduction into the blow mold. The parison is then expanded into conformance with the blow mold, as by means of air pressure admitted through the blow core 3 and, upon cooling sufficiently to be handled, it is removed from the blow mold 5. In order to facilitate such removal, the blow mold may be constructed of two halves 5a and 5b which may be separated, as shown, releasing the finished article 8 which contains an inner layer representing the liner 7, as expanded together with the parison in the course of its deformation in the blow mold 5, as described. The parison mold 2 and the neck mold 2d may also consist of more than one part each which may be separable to facilitate the removal of the parison or of the finished article, respectively.

The mechanical operation of the several elements shown in FIGS. 1a to 1d may be carried out by means described in my U.S. Pat. No. 3,029,468 and in numerous other patents, such as for example U.S. Pat. No. 2,913,762, U.S. Pat. No. 2,298,716 and others. An apparatus particularly well suited for the purposes of the present invention is described in my U. S. Pat. No. Re. 27,104.

In accordance with one embodiment of the present invention, the elements shown in FIG. 1 are employed in the manner indicated in FIG. 2 wherein the said elements are represented by the symbols shown schematically having like numerals on the respective elements in FIG. 1 and in which the movement of these elements is carried out by conventional means, now shown, described for example in the U. S. patents referred to above.

The sequence of operations depicted as Steps A to G according to FIG. 2 is as follows:

Liner 7 is transferred with blow mold 5 from the dotted-line position while core 3 and parison mold 2 are separated, as shown in Step A. In Step B, blow mold 5 is brought into juxtaposition with the liner 7 held in blow mold 5. The liner is transferred onto the blow core. In Step C, the blow core with the liner thereon is removed from the blow mold 5 which is then shifted out of the path of the blow core 3. In Step D, the blow core and liner are placed into parison mold 2, clamped together therewith and hot plastic is injected around the liner 7. In the next following step E, the blow core 3 with the injected parison surrounding sleeve 7 thereon is removed from the parison mold 2, inserted with blow mold 5 and the parison, together with liner 7 is expanded in the blow mold 5 into conformance therewith. Upon completion of such expansion and sufficient cooling of the blown article, the blow mold 5 and the blow core 3 are separated and the blow mold 5 is shifted out of the path of the blow core 3 with the blown article therein, as per Step F and the finished article is removed from the blow mold 5, as shown in Step G, in which the several elements of the apparatus are shown as being again returned to the position in which a new sleeve 7 may be inserted into the blow mold 5 to begin the next cycle.

It is evident from FIG. 1 that liner 7 is smaller than the cavity of the blow mold 5; therefore, in order for the blow mold 5 to carry liner 7 with sufficient accuracy to place it over the blow core 3, it is necessary to place the liner into a predetermined position within the blow mold and to hold it firmly in that position while the blow mold is moved into the path of the blow core and the blow core 3 and blow mold 5 are brought together, as in Step B of FIG. 2, by inserting the blow core into the blow mold or by carrying the blow mold over the blow core. As shown in FIG. 3, this is accomplished by using an indexing finger 9 which is arranged to receive one liner at a time from a magazine (not shown) to insert the liner into the cavity 5c of blow mold 5. The blow mold contains a bottom pad 10 which may be a single piece, or it may consist of two parts, each movable in unison with the blow mold halves 5a and 5b. Bottom pad 10 is connected to a source of vacuum (not shown) by means of holes 11 and pipe 12. Upon insertion of liner 7 by means of finger 9, vacuum is applied at the bottom of liner 7 that is in contact with pad 10 through pipe 12 and hole 11 causing liner 7 to adhere firmly enough to pad 10 not to change position in the course of the movement of blow mold 5 intended to bring liner 7 into alignment with core 3. Other means to hold liner 7 firmly within blow mold 5 may be used, such as friction surfaces or mechanically actuated clips; however, the use of vacuum appears the most convenient for most purposes, as above described.

Figure 4:
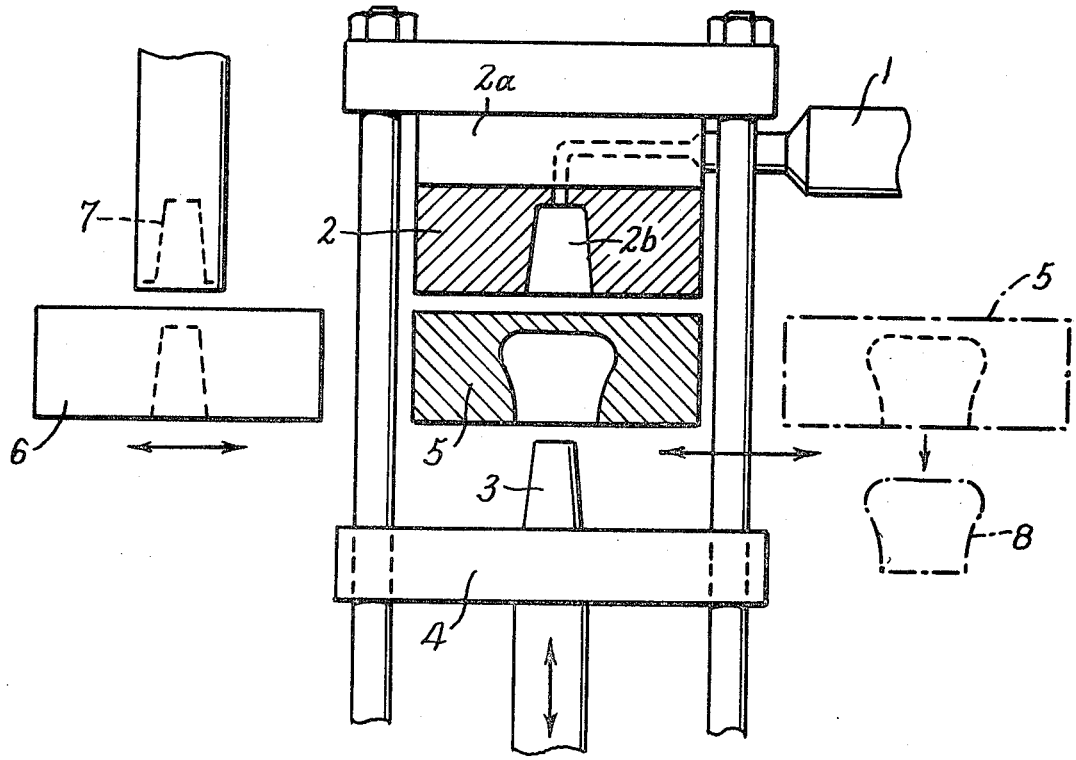
FIG. 4 is an elevation, partly in section, of a laterally movable liner fixture in an injection blow molding apparatus havingne set of blow cores.

Instead of using the blow mold to place liners upon the cores, a separate liner fixture may be employed, as shown in FIG. 4 in which an injection unit 1 is provided to supply hot plastic to the parison mold 2 through runner plate 2a. A blow core 3 is attached to a reciprocating plate 4 which may be moved in the direction of the arrow by conventional means, not shown. Blow mold 5 is capable of being shifted sideways into the dotted-line position. A liner holding fixture 6 is capable of receiving liner 7 from a magazine and of carrying them along the path indicated by the arrow with the position at which they are to be applied to the blow core 3. In operation, blow core 3 is inserted into the parison mold cavity 2b and held in that position by a clamp (not shown). Heated plastic is injected under pressure by the injection unit 1 through runner plate 2a and the parison formed thereby is removed from cavity 26 together with the blow core 3. During that time, blow mold 5 is of course in a position outside the path of blow core 3 as indicated by the dotted lines. The blow mold is now brought into alignment with the blow core 3 by shifting it into the position shown in FIG. 4. The blow core, together with the parison is now inserted into the blow mold 5 and the finished article is blown into conformance therewith. The blow core 3 is next withdrawn and the blow mold 5 again shifted to the dotted line position where the finished article 8 is removed, as shown. At the same time, liner holding fixture 6 containing at least one liner, is shifted into alignment with blow core 3 and the two are brought together so as to carry out the transfer of the liner 7 onto the blow core 3. The fixture 6 is next removed from the axial path of the blow core 3 which is inserted into the parison mold cavity 26 again, to start the next cycle.

It is seen that the transfer of liners onto the blow core prolongs the operating cycle, compared to an injection blow molding operation in which no liner is applied to the blow core. In order to minimize, or altogether avoid an increase in cycle time, apparatus according to FIGS. 5, 6 or 7 may be used.

Figure 5:
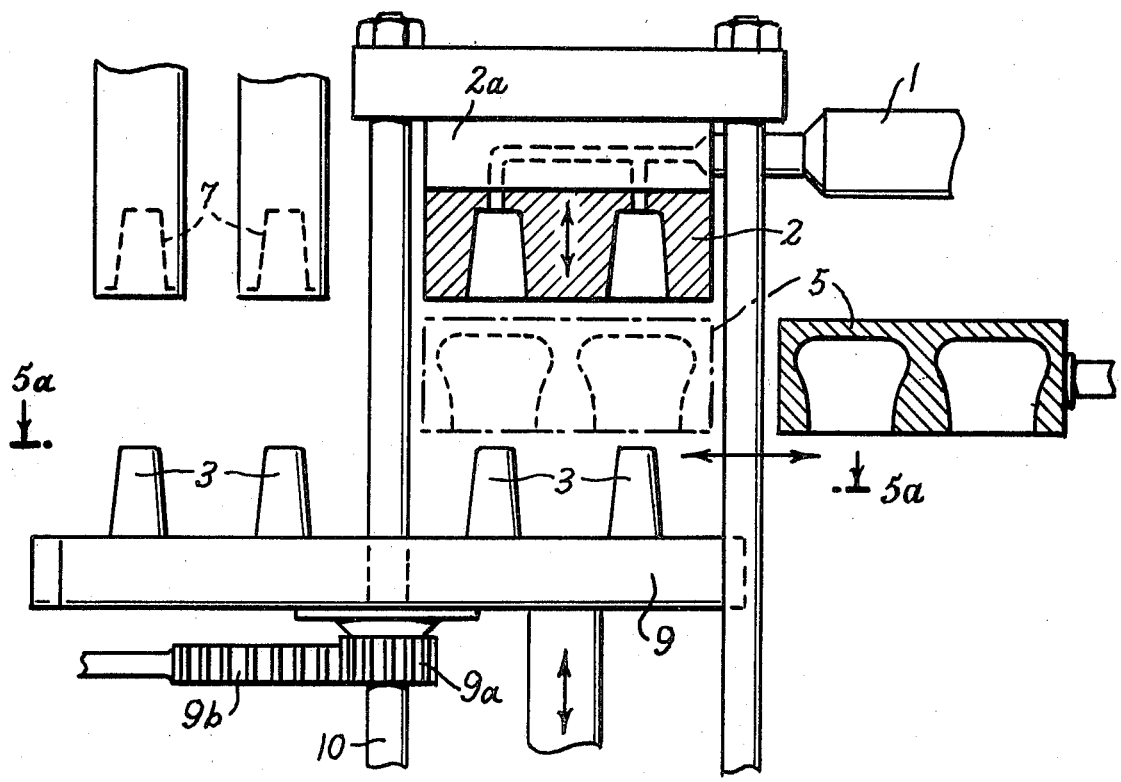
FIG. 5 is an elevation, partly in section, of a rotatable blow core assembly having two sets of blow cores.
Figure 5A:
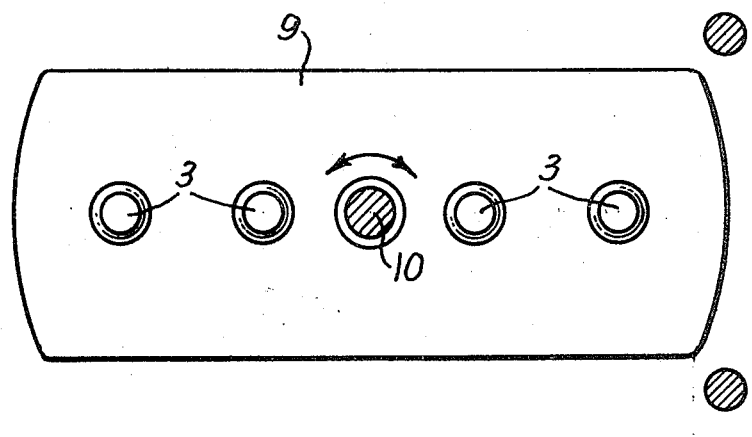
FIG. 5a is a section taken on the line 5a – 5a of FIG. 5.

According to FIGS. 5 and 5a, two blow cores, or in the case of multiple blow cores, two sets of blow cores are mounted on a common platen 9 which may be rotated or oscillated around the shaft 10 by suitable means, such as by rack 9b acting upon pinion 9a moving in the direction of the arrow, which shaft also serves to guide platen 9 in its movements parallel to the axis of blow cores 3. As shown in FIG. 5, when one of the blow cores 3 is in alignment with parison mold 2, the other is aligned with a liner 7 furnished from a magazine. In operation, platen 9 is moved upward in the direction of the arrow whereby a first set of blow cores 3 is inserted into parison mold 2 and a second blow core set is inserted into liners 7 obtained from their magazine. The parison is then molded around the first blow cores within the parison mold and the assembly consisting of platen 9 and of the two blow cores 3 is lowered. A blow mold, as previously described, and shown in dot dash lines is now brought into juxtaposition with the first blow core and the finished article is blown therein. The blow mold with the finished article is removed from the blow core and the assembly consisting of the platen 9 and the two blow cores 3 mounted thereon is rotated around rod 10 in the direction of the arrow, so as to align the first set of cores, to receive the next liners 7 and to align the second set of blow cores carrying liners 7 with the parison mold 2. Since the time used for molding the parison on one set of cores is also used to apply liners to the other set of cores, no time is spent for the application of the liner in excess of the time normally needed for parison production.

A particular type of molding apparatus including a plurality of blow cores has been illustrated in FIG. 5. However, it is understood that the invention may be applied to various types of molding apparatus including two or more blow cores which are mounted to be shifted between successive stations by suitable means, for example by rotation. Various types of such apparatus involving a first station where the parison is injected, a second station where the parison is blown, and a third station where the blown article is discharged are well known in the art. Examples are shown in U. S. Pat. Nos. 3,183,552, 3,100,913, 3,339,231 and 3,480,993. It is obvious that in such apparatus, the liner may be applied to the blow core at the station in advance of the station wherein the parison is injected. Such apparatus may or may not include axial movement of the apparatus.

Figure 6:
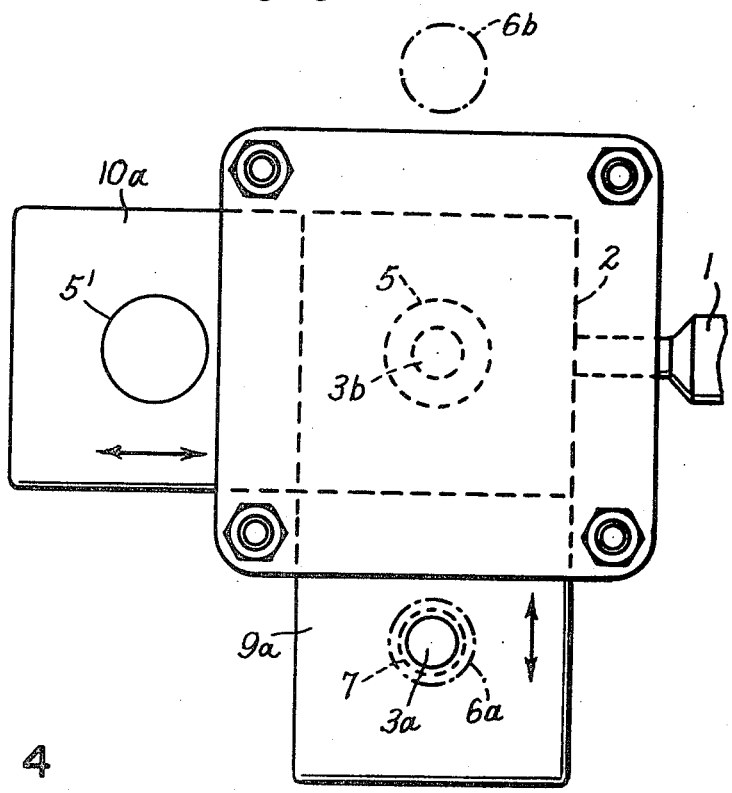
FIG. 6 is an elevation, partly in section, of a laterally movable liner fixture in an injection blow molding apparatus having two sets of blow cores.

FIG. 6 shows still another embodiment wherein slides 9a and 10a move perpendicularly to each other, slide 9a carrying two blow cores 3a and 3b, each of which is in alignment with a stationary liner fixture 6a and 6b respectively and corresponding magazines for liners when shifted to non-molding positions. The slide 10a carries the blow mold 5 and is shiftable into and out of molding position beneath the parison mold 2 and alternately into discharge position 5a. Thus each blow core 3a and 3b, when in one position, receives a liner 7 from the aligned fixtures 6a and 6b respectively, and when in molding position receives a parison from the parison mold 2 on one stroke and its parison is blown in the blow mold 5 on its next stroke. Each blow core produces a finished article on every third stroke.

Figure 7:
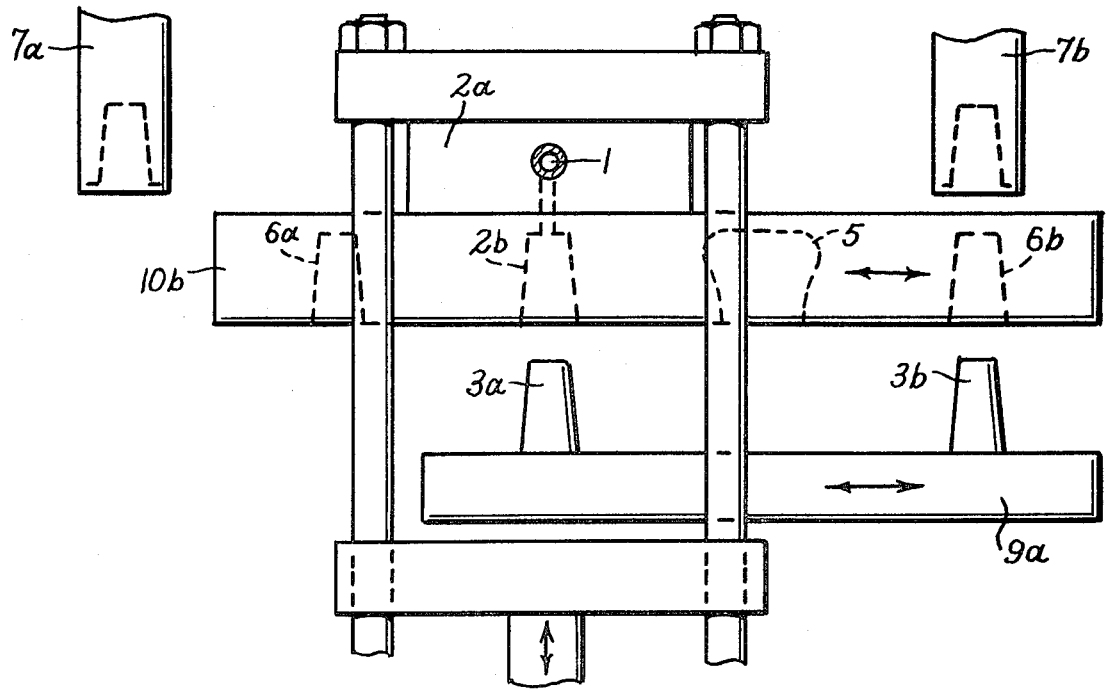
FIG. 7 is an elevation partly in section of another arrangement of laterally movable liner fixtures in an injection blow molding apparatus.
Figure 8:
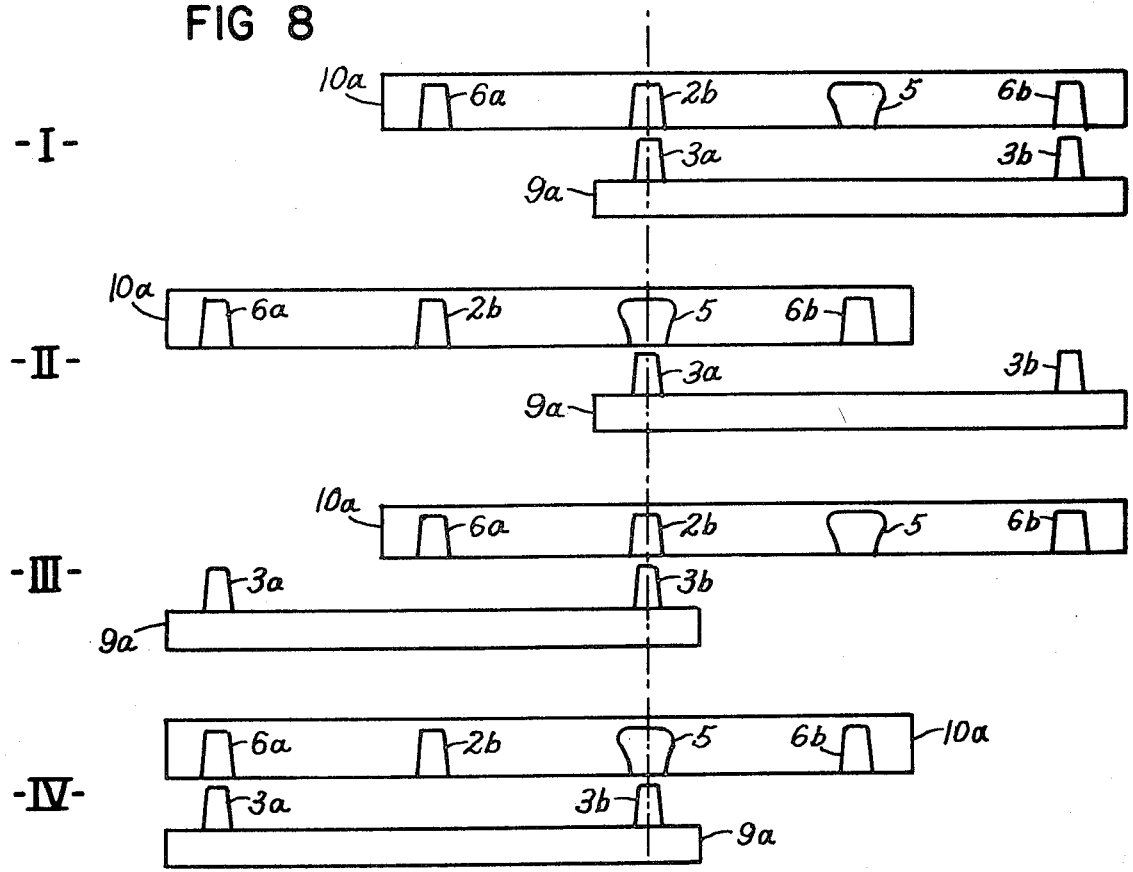
FIG. 8 is a liner diagram showing the operation of the apparatus according to FIG. 7.

FIG. 7 shows apparatus similar to FIG. 4, but including two liner fixtures. A core slide 9a, movable as indicated by the arrow, carries to blow cores 3a and 3b and a mold slide 10b carries the parison mold 2, the blow mold 5 and two insert lines holding fixtures 6a and 6b. The operation of this device is best understood by referring to the diagram in FIG. 8 showing steps I through IV of the operation of the device of FIG. 7. In step I blow core 3a which has previously been provided with an insert liner is clamped into parison mold cavity 26 and plastic is injected through runner plate 2a. In Step II the parison is removed from the parison mold on the blow core. Slide 10b is shifted sideways to align blow mold 5 with blow core 3a which is not inserted into blow mold 5 to blow the parison into conformance with it. In Step III the blow core 3a is next removed, leaving the finished article in the blow mold 5 and the slide 10b is shifted to its first position again. At the same time slide 9a is also shifted, bringing blow core 3b into alignment with parison mold cavity 2b. In that position of slide 9a relative to slide 10b, the following additional alignments are brought about: blow core 3a is aligned with fixture 6a, from which it receives an insert liner out of magazine 7a; blow mold 5 is in the ejecting position and the finished article 8 is removed. The assembly is returned to parison molding position as in Step IV. Thus, once upon every second stroke of the apparatus carrying the blow cores, one finished article is ejected and one parison is made; and once upon every second (i.e. the other, next following) stroke, an insert liner is applied and an article is blown. In other words, upon two strokes, a finished product is made which is the same as in the case of liner-less injection blow molding. Thus, the operating cycle is not prolonged on account of liner application; however, it requires the use of two blow cores instead of only one. It is noted that in the embodiment shown in FIG. 7 the blow cores must be spaced so as to provide clearance for removal of the finished article and to provide the alignment with the fixtures 6a and 6b respectively, while one of the blow cores is always aligned with the parison molding position.

In summary, the embodiments described show: In FIG. 2, the use of the blow mold as the fixture for the transport and placement of lines; in FIG. 4, the use of a separate fixture for that purpose, said fixture transporting the liners laterally; in FIG. 5, the use of a separate fixture for the transport of liners to the blow cores, the fixtures embodying more than one set of blow cores, movable by rotary motion; in FIG. 6, the use of a separate fixture as in FIG. 4, and of more than one set of blow cores arranged for in-line movement; and in FIG. 7, the use of more than one set of blow cores movable in-line and of a slide carrying the parison mold, the blow mold and the liner fixtures.

What is claimed is:

1. Apparatus for pressure blow molding plastic articles comprising a core, a parison mold and a blow mold, means for successively positioning said core in said parison mold for molding a parison and in said blow mold for blowing said parison into conformity with the cavity in said blow mold, said apparatus including means aligning said core with a previously formed liner shaped to conform generally to at least one portion of the surface of said core, means positioning said core and said liner in said parison mold and means for molding a layer of plastic around said liner to form a composite parison for blowing in said blow mold, means advancing said core between successive positions, said means for aligning the preformed liner with said core being effected by relative movement in a direction transverse to the direction of movement of said core.

2. Apparatus as set forth in claim 1 in which said core and said parison mold are positioned for molding said parison and separated after molding said parison in an axial direction and said liner and said core are aligned by relative movement transversely to said axial direction.

3. Apparatus as set forth in claim 1 in which said transverse movement takes place in a linear path.

4. Apparatus as set forth in claim 1 in which said transverse movement takes place in an arcuate path.

5. Apparatus as set forth in claim 1 in which a carrier is provided to hold said liner and to apply the same to said core.

6. Apparatus according to claim 5 in which a magazine carrying said liner is disposed to supply a liner to said carrier.

7. Apparatus as set forth in claim 5 in which said core is advanced and retracted in a straight axial path, means is provided to shift said blow mold transversely of said path into and out of blow position wherein said core and parison are inserted for blowing, and said liner carrier is shifted transversely into and out of the path of said core for applying the liner to said core prior to the introduction of said core into said parison mold.

8. Apparatus as set forth in claim 7 in which the paths of said blow mold and said liner carrier lie in the same transverse plane.

9. Apparatus as set forth in claim 7 in which the paths of said blow mold and of said liner carrier are normal to each other.

10. Apparatus as set forth in claim 5 in which said blow mold is the carrier.

11. Apparatus as set forth in claim 10 in which means is provided in said blow mold for securing the liner in place prior to application of said liner to said core.

12. Apparatus as set forth in claim 11 in which said securing means comprises a suction device.

* * * * *